United States Patent Office 3,755,505
Patented Aug. 28, 1973

3,755,505
O,O-DIALKYL S(2-[3-(SUBSTITUTED)UREIDO] ETHYL)PHOSPHORODITHIOATES
Herman O. Senkbeil and D. Wendell Osborne, Midland, Mich., assignors to The Dow Chemical Company, Midland, Mich.
No Drawing. Filed June 3, 1970, Ser. No. 43,188
Int. Cl. C07f 9/16; A01n 9/36
U.S. Cl. 260—938　　　　　　　　　　　9 Claims

ABSTRACT OF THE DISCLOSURE

The present invention is directed to novel O,O-dialkyl S - (2 - [3 - (substituted)ureido]ethyl)phosphorodithioates of the formula:

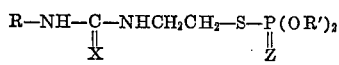

wherein R represents

a lower alkyl group of from 1 to about 3, inclusive, carbon atoms, or a benzyl radical; Y represents chlorine, bromine, hydrogen, methoxy, lower alkyl, nitro, or $\alpha,\alpha,\alpha$-tri-fluoromethyl; $n$ represents an integer of 1, 2 or 3; X and Z each independently represent oxygen or sulfur, and R' represents a lower alkyl group of from 1 to about 3, inclusive, carbon atoms. The compounds of the present invention are useful as insecticides and fungicides.

SUMMARY OF THE INVENTION

The present invention is directed to compounds of the formula:

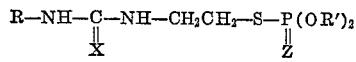

which are useful as fungicides and insecticides. In the above and succeeding formulae in the present specification and claims, R represents

a lower alkyl group of from 1 to about 3, inclusive, carbon atoms, or a benzyl radical; Y represents chlorine, bromine, hydrogen, methoxy, lower alkyl, nitro, or $\alpha,\alpha,\alpha$-tri-fluoromethyl; $n$ represents an integer of 1, 2 or 3; X and Z each independently represent oxygen or sulfur, and R' represents a lower alkyl group of from 1 to about 3, inclusive, carbon atoms such as methyl, ethyl, propyl and isopropyl.

Typically, the compounds of the present invention are crystalline solids which are somewhat soluble in many common organic solvents and of low solubility in water.

The compounds of the present invention are prepared in one embodiment (Method A by reacting ethylenimine with an aromatic or alkyl isocyanate or isothiocyanate compound to form a 1-aziridinecarboxanilide intermediate (II). The intermediate (II) is further reacted with an O,O-dialkylphosphorodithioic acid in the presence of an organic solvent to form the compounds (I) of the present invention. The reaction of this method may be represented in simplified form in the following equation:

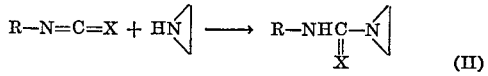

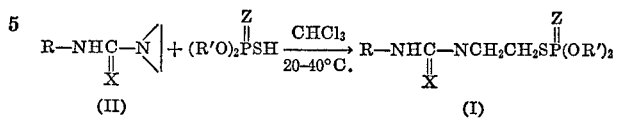

In an alternative method, (Method B), the phosphorodithioates (I) of the present invention are prepared by reacting O,O-dialkyl phosphorodithioic acids with ethylenimine to produce the O,O-dialkyl S-2-aminoethyl phosphorodithioate intermediate (III), which is subsequently reacted with aromatic or alkyl isocyanates or isothiocyanates to form the compounds (I) of the present invention. The reaction of this alternative method (B) may be represented by the following equation

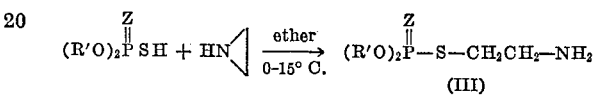

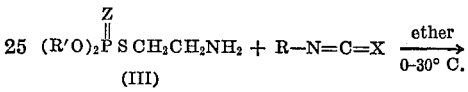

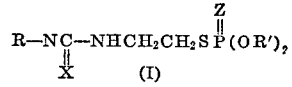

In the formulae of Methods A and B above, R, R', X and Z are as hereinbefore described.

In the actual practice of Method A, the new compounds may be prepared by reacting an aziridine carboxanilide intermediate (II) with an O,O-dialkyl phosphorodithioic acid; such intermediate (II) being prepared by reacting ethylenimine and an alkyl or aryl isocyanate or isothiocyanate according to the procedures set forth in U.S. Pat. No. 2,775,587. The reaction of the intermediate (II) and acid reactant conveniently may be carried out in an inert solvent such as, for example, acetone, dimethylformamide, acetonitrile, carbon tetrachloride, chloroform, benzene, toluene, ethyl methyl ketone, isobutyl methyl ketone, methanol, ethyl acetate, or methylene dichloride. The reaction ordinarily consumes the reactants in amounts representing essentially equimolar proportions of each and, while not critical, the use of such amounts is preferred. The reaction is somewhat exothermic and takes place smoothly at temperatures of from about 20 to about 40° C., but is preferably carried out at temperatures of from about 25 to about 35° C. If desired, the temperature may be controlled by regulating the rate of contacting the reactants and/or by external cooling. While the reaction may be conducted over a wide range of pressures, no particular advantage ordinarily results from the use of subatmospheric or superatmospheric pressures and the reaction is therefore ordinarily carried out at atmospheric pressure.

In carrying out the reaction, the aziridine-carboxanilide intermediate and O,O-dialkyl phosphorodithioic acid reactant may be conveniently contacted portionwise in the presence of an inert solvent. Preferably, the intermediate and acid reactant are dissolved in separate portions of solvent, with the intermediate-solvent portion being added dropwise to the acid portion. The addition is generally carried out with stirring over a period of from about 10 to 25 minutes. The resulting reaction mixture is maintained with stirring in the reaction temperature range for a period of time sufficient to assure substantial completion of the reaction, preferably from about 3 to about 5 hours.

Upon completion of the reaction, the reaction mixture is neutralized with a small portion of a base, e.g., sodium bicarbonate solution, and washed with water to remove byproducts. The reaction mixture is usually dried over sodium sulfate and filtered; the remaining reaction medium may be removed from the reaction mixture by evaporation or distillation under reduced pressure to obtain the desired product as a liquid residue. The latter may be further purified by conventional procedures such as washing, extraction and recrystallization from common organic solvents.

In the alternative Method B, the new compounds (I) may be prepared by reacting an O,O-dialkyl S-2-aminoethyl phosphorodithioate (III) with aryl or alkyl isocyanates of isothiocyanates. The intermediate (III) is generally prepared by dissolving essentially equimolar proportion of ethylenimine and an O,O-dialkyl phosphorodithioic aicd reactant in separate portions of ether and dropwise adding the acid portion to the ethylenimine portion. The addition is generally carried out with stirring over a period of about one hour and at a temperature of from about 0 to about 15° C. The resulting mixture is maintained with stirring in the reaction temperature range for about two to three hours, whereupon the ether reaction medium is removed by evaporation under subatmospheric pressure to obtain the desired intermediate (III) as a liquid residue. The intermediate may be further purified by conventional procedures such as washing, extraction, recrystallization and the like.

The reaction of the O,O-dialkyl S-2-aminoethyl phosphorodithioate intermediate and the isocyanates or isothiocyanates conveniently may be carried out in an inert reaction medium, such as ether. The reactant usually consumes the reactants in amounts representing essentially equimolar proportions of each and, while not critical, the use of such amounts is preferred. The reaction takes place smoothly at temperatures of from 0 to about 30° C. and is ordinarily conducted at normal atmospheric pressure.

In carrying out the reaction according to Method B, the intermediate (III) is usually dissolved in ether and the isocyanate or isothiocyanate reactant is added portionwise or dropwise thereto. When added dropwise, the addition is ordinarily carried out with stirring over a period of about 20 minutes and the resulting reaction mass is maintained with stirring in the reaction temperature range for a period of time sufficient to assure substantial completion of the reaction, generally from about 2 to about 4 hours. When added in portions, the resulting reaction mass is maintained as above for a period of about 14 to about 20 hours, preferably under ambient temperature conditions. Upon substantial completion of the reaction, the reaction medium may be removed from the reaction mass and the desired product further purified according to the procedures previously set forth in Method A.

DESCRIPTION OF THE PREFERRED EMBODIMENTS

The following examples illustrate the invention but are not to be construed as limiting:

EXAMPLE 1

O,O,-dimethyl S-(2-(3-(p-tolyl)uredio)ethyl) phosphorodithioate

A solution of 18.8 g. (0.107 mole) of 1-aziridinecarboxy-p-toluidine in 150 cc. of chloroform was added dropwise with stirring to 17.7 g. (0.112 mole) of O,O-dimethyl phosphorodithioic acid dissolved in 100 cc. of chloroform. The addition was carried out over a period of about 15 minutes and at a temperature of from about 24 to about 34° C. Following the addition, the reaction mixture was stirred at a temperature of about 24.5 to about 26.5° C. for about 4 hours in order to substantially complete the reaction. Following the completion of the reaction, the reaction mixture was neutralized by washing twice with sodium bicarbonate solution and water-soluble impurities were removed by washing twice with water. The reaction mixture was then dried over sodium sulfate, filtered, and subjected to subatmospheric pressure in order to remove the chloroform from the reaction mixture. The viscous liquid residue thus obtained was successively crystallized from a benzene-hexane mixture. As a result of these operations, the desired O,O-dimethyl S-(2-(3-(p-tolyl)ureido)ethyl)phosphorodithioate was obtained as a crystalline solid melting at 58–60° C.

EXAMPLE 2

O,O-diethyl S-(2-(3-p-methoxyphenyl)ureido)ethyl phosphorodithioate

A solution of 20.5 g. (0.107 mole) of 1-aziridinecarboxy-p-anisidide in 150 cc. of chloroform was added dropwise with stirring to 20.8 g. (0.112 mole) of O,O-diethyl phosphorodithioic acid dissolved in 100 cc. of chloroform. The addition was carried out over a period of 17 minutes and at a temperature of from about 24 to about 34° C. Following the addition, the reaction mixture was maintained with stirring for about 3 hours in the reaction temperature range in order to substantially complete the reaction. The resulting clear liquid reaction mixture was neutralized by washing twice with sodium bicarbonate solution, and water-soluble impurities were removed by washing twice with water. Thereafter, the reaction mixture was successively dried over sodium sulfate, filtered, and subjected to subatmospheric pressures in order to evaporate the chloroform from the reaction mixture. The viscous liquid residue thus obtained was dissolved in an ethyl acetate-hexane mixture from which, after refrigeration for five days, the O,O-diethyl S-(2-(3-p-methoxy phenyl)ureido)ethyl phosphorodithioate product precipitated as a crystalline solid. The product was separated by filtration and dried. The dried product was found to melt at 70–71.5° C.

EXAMPLE 3

O,O-diethyl S-(2-(3-methyl)ureido)ethyl phosphorodithioate

Methyl isocyanate (~10 cc.) was added in portions to 22.9 g. (0.10 mole) of S-(2-aminoethyl) O,O-diethyl phosphorodithioate dissolved in 100 cc. of ether. The resulting mixture was maintained with stirring for about 16 hours at ambient temperatures and under normal atmospheric pressure, after which time period the ether was removed from the reaction mixture by evaporation under a reduced pressure. The viscous liquid residue thus obtained was successively crystallized from ethyl acetate-hexane. As a result of these operations, there was obtained an O,O-diethyl S-(2-(3-methyl)uredio)ethyl phosphorodithioate product melting at 55–57° C.

EXAMPLE 4

O,O-diethyl S-(2-(3-phenyl-2-thioureido)ethyl) phosphorodithioate

Phenyl isothiocyanate (13.5 g., 0.10 mole) dissolved in 50 cc. of ether was added dropwise with stirring to 205 cc. of an ether solution containing S-(2-aminoethyl) O,O-diethyl phosphorodithioate (~0.10 mole). The addition was carried out over a period of about 10 minutes at a temperature of from 0° to about 5° C. Following the addition, stirring of the reaction medium was continued for about 2 hours under normal atmospheric pressure. After the completion of the reaction, the ether was removed from the reaction mixture by evaporation under vacuum, leaving a viscous liquid residue. As a result of these operations, the desired O,O-diethyl S-(2-(3-phenyl-2-thioureido)ethyl)phosphorodithioate was obtained as a viscous liquid residue which slowly crystallized upon standing; it was recrystallized from methylcyclohexane and the recrystallized material melted at 94–98° C.

Other representative products of the present invention are prepared with the procedures reported in Examples 1–4 above, using the respective corresponding aziridinecarboxanilide (II) intermediate and the O,O-dialkyl phosphorodithioic acid reactant or the O,O-dialkyl S-2-aminoethyl phosphorodithioate (III) intermediate and the isocyanate or isothiocyanate reactant. These other representative products are identified in the following table.

EXAMPLES 5–31

$$\text{R—NH}\overset{\text{Z}}{\underset{\text{X}}{\text{C}}}\text{—NHCH}_2\text{CH}_2\text{S}\overset{\parallel}{\text{P}}(\text{OR}')_2$$

| Compound No. | R | X | Z | R' | Characterizing property |
|---|---|---|---|---|---|
| 5 | C₆H₅– | O | S | (OC₂H₅)₂ | M.P. 43–55° C. |
| 6 | Same as above | S | S | (OC₂H₅)₂ | M.P. 94–98° C. |
| 7 | do | S | S | (OC₃H₇)₂ | M.W. 376. |
| 8 | 4-CH₃-C₆H₄– | O | S | (OCH₃)₂ | M.P. 58–60° C. |
| 9 | Same as above | O | S | (OC₂H₅)₂ | M.P. 60–62° C. |
| 10 | 4-C₃H₇-C₆H₄– | O | S | (OC₃H₇)₂ | M.W. 418. |
| 11 | 2-CH₃-C₆H₄– | O | S | (OCH₃)₂ | M.P. 84–85° C. |
| 12 | 2-CH₃-C₆H₄– | S | S | (OCH₃)₂ | M.W. 350. |
| 13 | 2,4,6-(CH₃)₃-C₆H₂– | O | S | (OC₃H₇)₂ | M.W. 418. |
| 14 | 3-CH₃-C₆H₄– | O | S | (OCH₃)₂ | M.P. 90–95° C. |
| 15 | 4-CH₃O-C₆H₄– | O | S | (OC₂H₅)₂ | M.P. 70–71.5° C. |
| 16 | Same as above | O | S | (OCH₃)₂ | M.P. 77–79° C. |
| 17 | 3,5-(C₂H₅O)₂-C₆H₃– | O | S | (OC₃H₇)₂ | M.W. 464. |
| 18 | 3,4,5-(CH₃O)₃-C₆H₂– | O | S | (OC₃H₇)₂ | M.W. 466. |
| 19 | 3,4-(CH₃O)₂-C₆H₃– | O | S | (OC₃H₇)₂ | M.W. 436. |
| 20 | 4-Cl-C₆H₄– | O | S | (OC₂H₅)₂ | M.P. 86–88.5° C. |
| 21 | 3,4-Cl₂-C₆H₃– | O | S | (OC₂H₅)₂ | M.P. 61–65° C. |
| 22 | 2,4,5-Cl₃-C₆H₂– | S | S | (OC₂H₅)₂ | M.W. 467. |
| 23 | 2,5-Cl₂-C₆H₃– | O | S | (OC₃H₇)₂ | M.W. 445. |
| 24 | 3,5-(CF₃)₂-C₆H₃– | O | S | (OC₂H₅)₂ | M.P. 92–93.5° C. |
| 25 | Same as above | O | S | (OCH₃)₂ | M.P. 96–98.5° C. |
| 26 | CH₃– | O | S | (OC₂H₅) | M.P. 55–57° C. |
| 27 | 4-NO₂-C₆H₄– | O | S | (OCH₃)₂ | N_D²⁵ 1.5896. |
| 28 | Same as above | O | S | (OC₂H₅)₂ | N_D²⁵ 1.5825. |
| 29 | 2-NO₂-C₆H₄– | O | S | (OC₂H₅)₂ | M.W. 438. |
| 30 | 2,4-(NO₂)₂-C₆H₃– (with 5-NO₂) | O | S | (OC₃H₇)₂ | M.W. 511. |
| 31 | C₆H₅-CH₂– | O | S | (OC₃H₇)₂ | M.W. 390. |

The products of the present invention are useful as pesticides for the control of a wide variety of fungal and bacterial organisms such as *Candida pelliculosa*, *Bacillus subtilis*, *Trichophton mentagrophytes*, *Mycobacterium phlei*, and *Staphylococcus aureus*. They are also found to exhibit pesticidal activity on insects such as two spotted spider mites and yellow fever mosquito larvae. For any of these uses, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 5 to about 500 parts per million of one or more of the compounds.

In representative operations, each of

O,O-diethyl S-(2-(3-α,α,α-α',α',α'-hexafluoro-3,5-xylyl)ureido)ethyl phosphorodithioate,
O,O-dimethyl S-(2-(3-α,α,α,α',α',α'-hexafluoro-3,5-xylyl)ureido)ethyl phosphorodithioate,
O,O-diethyl S-(2-(3-(3,4-dichloro-phenyl)ureido)ethyl) phosphorodithioate,
O,O-dimethyl S-(2-(3-(p-nitrophenyl)ureido)ethyl) phosphorodithioate and O,O-diethyl S-(2-(3-(p-nitrophenyl)ureido)ethyl phosphorodithioate compounds gives complete control and kill of the organisms *Staphylococcus aureus, Bacillus subtilis* and *Mycobacterium Phlei*, and each of the O,O-dimethyl S-(2-(3-(p-nitrophenyl)ureido)ethyl)phosphorodithioate and O,O-diethyl S-(2-(3-(p-nitrophenyl)-ureido)ethyl)phosphorodithioate compounds gives complete control and kill of *Trichophton mentagrophytes* when one of the named compounds is separately applied to the environments containing and supporting thriving members of one of such organisms at a concentration of 500 parts per million by weight.

In further representative operation, each of the

O,O-diethyl S-(2-(3-methyl-ureido)ethyl)phosphorodithioate,
O,O-diethyl S-(2-(3-(m-chlorophenyl)ureido)ethyl) phosphorodithioate,
O,O-diethyl S-(2-(3-($\alpha,\alpha,\alpha,\alpha',\alpha',\alpha'$-hexafluoro-3,5-xylyl)ureido)ethyl)phosphorodithioate,
O,O-dimethyl S-(2-(3-($\alpha,\alpha,\alpha,\alpha',\alpha',\alpha'$-hexafluoro-3,5-xylyl)ureido)ethyl)phosphorodithioate,
O,O-diethyl S-(2-(3-(3,4-dichlorophenyl)ureido)ethyl) phosphorodithioate and
O,O-diethyl S-(2-(3-phenyl-2-thioureido)ethyl)phosphorodithioate compounds gives complete control and each of the O,O-diethyl - S - (2 - (3-(p-nitrophenyl)ureido)ethyl)phosphorodithioate and O,O-diethyl S-(2-(3-(phenyl-ureido)ethyl)phosphorodithioate compounds gives substantially complete control of yellow fever mosquito larva when such organisms are contacted with compositions containing one of the above named compounds at a concentration of 5.0 parts per million by weight.

In additional operations, each of the

O,O-diethyl-S(2-(3-(3,4-dichloro-phenyl)ureido)ethyl) phosphorodithioate,
O,O-dimethyl S-(2-(3-p-nitro-phenyl)ureido)ethyl phosphorodithioate and
O,O-diethyl S-(2-(3-phenyl-ureido)ethyl)phosphorodithioate compounds gives complete control and kill of two-spotted spider mites when such organisms are contacted with compositions containing one of the named compounds at a concentration of 500 parts per milion by weight.

We claim:
1. An O,O-dialkyl S-(2-[3-(substituted)ureido]ethyl) phosphorodithioate compound corresponding to the formula:

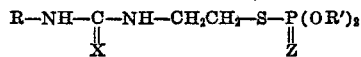

wherein R represents

Y represents methoxy, lower alkyl or $\alpha,\alpha,\alpha$ - trifluoromethyl; $n$ represents an integer of 1, 2 or 3; X and Z each independently represent oxygen or sulfur, and R' represents a lower alkyl group of from 1 to about 3, inclusive, carbon atoms.

2. The compound claimed in claim 1 which is O,O-diethyl S-(2 - (3 - (p - methoxyphenyl)ureido)ethyl) phosphorodithioate.

3. The compound claimed in claim 1 which is O,O-dimethyl S-(2 - (3 - (p - methoxyphenyl)ureido)ethyl) phosphorodithioate.

4. The compound claimed in claim 1 which is O,O-dimethyl S-(2 - (3 - (p - tolyl)ureido)ethyl) phosphorodithioate.

5. The compound claimed in claim 1 which is O,O-diethyl S-(2 - (3 - (p - tolyl)ureido)ethyl) phosphorodithioate.

6. The compound claimed in claim 1 which is O,O-diethyl S - (2 - (3 - ($\alpha,\alpha,\alpha,\alpha',\alpha',\alpha'$ - hexafluoro - 3,5-xylyl)ureido)ethyl) phosphorodithioate.

7. The compound claimed in claim 1 which is O,O-dimethyl S-(2 - (3 - (o-tolyl)ureido)ethyl phosphorodithioate.

8. The compound claimed in claim 1 which is O,O-dimethyl S-(2 - (3 - ($\alpha,\alpha,\alpha,\alpha',\alpha',\alpha'$ - hexafluoro - 3,5-xylyl)ureido)ethyl phosphorodithioate.

9. The compound claimed in claim 1 which is O,O-dimethyl S-(2 - (3 - (m - tolyl)ureido)ethyl phosphorodithioate.

References Cited
UNITED STATES PATENTS

| | | | |
|---|---|---|---|
| 2,494,126 | 1/1950 | Hoegberg | 260—938 |
| 2,566,288 | 8/1951 | Hook et al. | 260—938 X |

LEWIS GOTTS, Primary Examiner

A. H. SUTTO, Assistant Examiner

U.S. Cl. X.R.
260—978; 424—211